(No Model.)

6 Sheets—Sheet 1.

M. L. MURPHY.

GLASS TANK FURNACE.

No. 555,964.

Patented Mar. 10, 1896.

WITNESSES:

Louis Edwards

C. A. Williams

INVENTOR

M. L. Murphy

BY John N. Roney his

ATTORNEY.

ANDREW B. GRAHAM, PHOTO-LITHO. WASHINGTON, D.C.

(No Model.) 6 Sheets—Sheet 2.

M. L. MURPHY.

GLASS TANK FURNACE.

No. 555,964. Patented Mar. 10, 1896.

WITNESSES:
Louis Edwards
C. A. Williams

INVENTOR
M. L. Murphy
BY Jno H. Roney
his
ATTORNEY.

ANDREW B. GRAHAM, PHOTO-LITHO. WASHINGTON, D.C.

(No Model.)

6 Sheets—Sheet 3.

M. L. MURPHY.
GLASS TANK FURNACE.

No. 555,964. Patented Mar. 10, 1896.

WITNESSES:
Louis Edwards
C. A. Williams

INVENTOR
M. L. Murphy
BY John H. Roney
his
ATTORNEY.

ANDREW B. GRAHAM. PHOTO-LITHO. WASHINGTON. D.C.

(No Model.) 6 Sheets—Sheet 4.

M. L. MURPHY.

GLASS TANK FURNACE.

No. 555,964. Patented Mar. 10, 1896.

WITNESSES:
Louis Edwards
C. A. Williams

INVENTOR
M. L. Murphy
BY John H. Roney
his
ATTORNEY.

ANDREW B. GRAHAM, PHOTO-LITHO. WASHINGTON, D.C.

(No Model.) 6 Sheets—Sheet 5.

M. L. MURPHY.

GLASS TANK FURNACE.

No. 555,964. Patented Mar. 10, 1896.

WITNESSES:
Louis Edwards.
C. A. Williams

INVENTOR
M. L. Murphy
BY John H. Roney
his
ATTORNEY.

ANDREW B GRAHAM. PHOTO-LITHO. WASHINGTON, D.C.

(No Model.)

6 Sheets—Sheet 6.

M. L. MURPHY.

GLASS TANK FURNACE.

No. 555,964. Patented Mar. 10, 1896.

WITNESSES:
Louis Edwards
C. A. Williams

INVENTOR.
M. L. Murphy
BY John H. Roney
his
ATTORNEY.

ANDREW B. GRAHAM, PHOTO-LITHO. WASHINGTON, D.C.

UNITED STATES PATENT OFFICE.

MICHAEL L. MURPHY, OF CORAOPOLIS, PENNSYLVANIA.

GLASS-TANK FURNACE.

SPECIFICATION forming part of Letters Patent No. 555,964, dated March 10, 1896.

Application filed December 4, 1894. Serial No. 530,798. (No model.)

*To all whom it may concern:*

Be it known that I, MICHAEL L. MURPHY, a citizen of the United States, residing at Coraopolis, in the county of Allegheny and State of Pennsylvania, have invented certain new and useful Improvements in Glass-Tank Furnaces; and I do hereby declare the following to be a full, clear, and exact description of the invention, such as will enable others skilled in the art to which it pertains to make and use the same, reference being had to the accompanying drawings, which form a part of this specification, in which—

Figure 1:
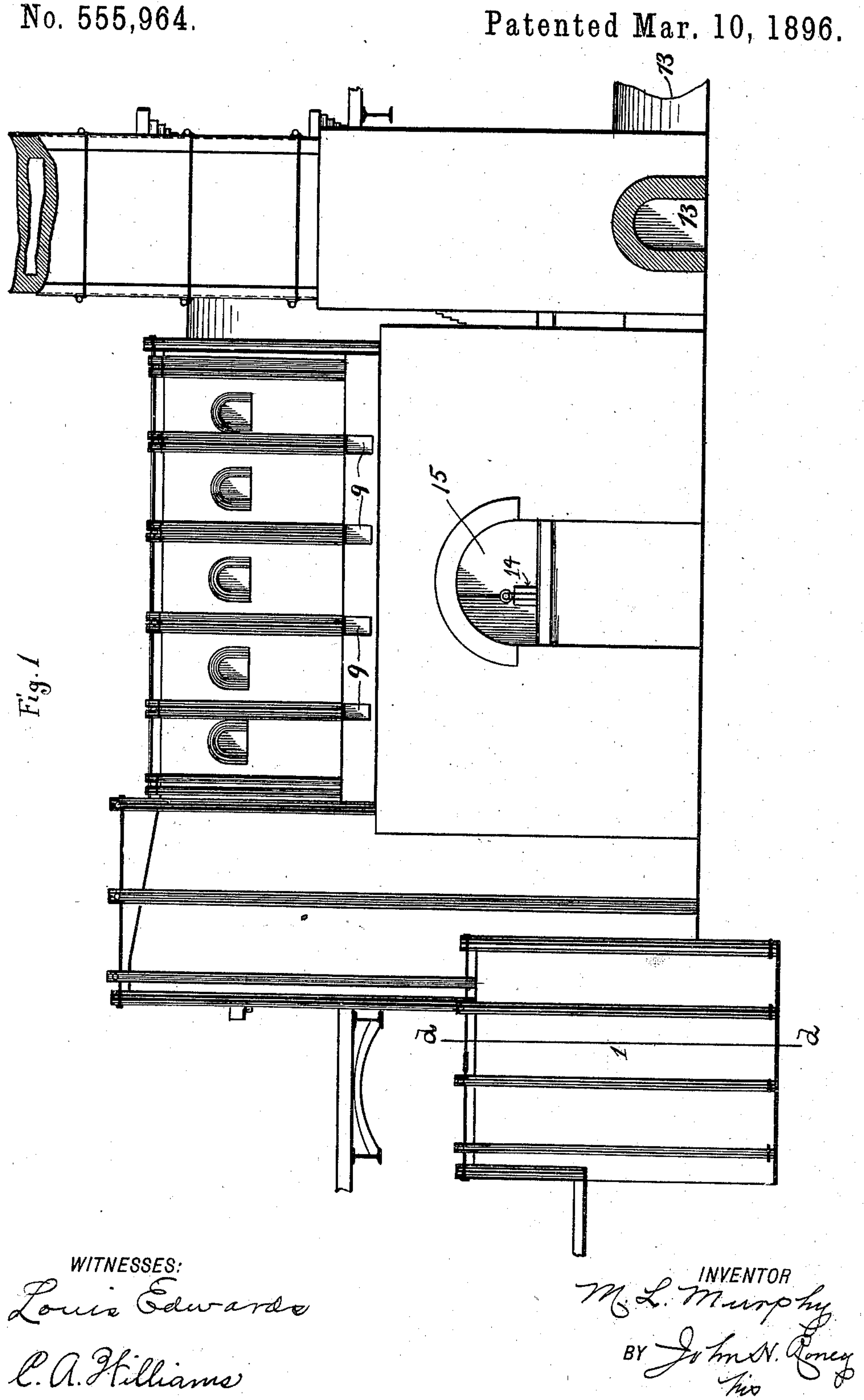
Figure 2:
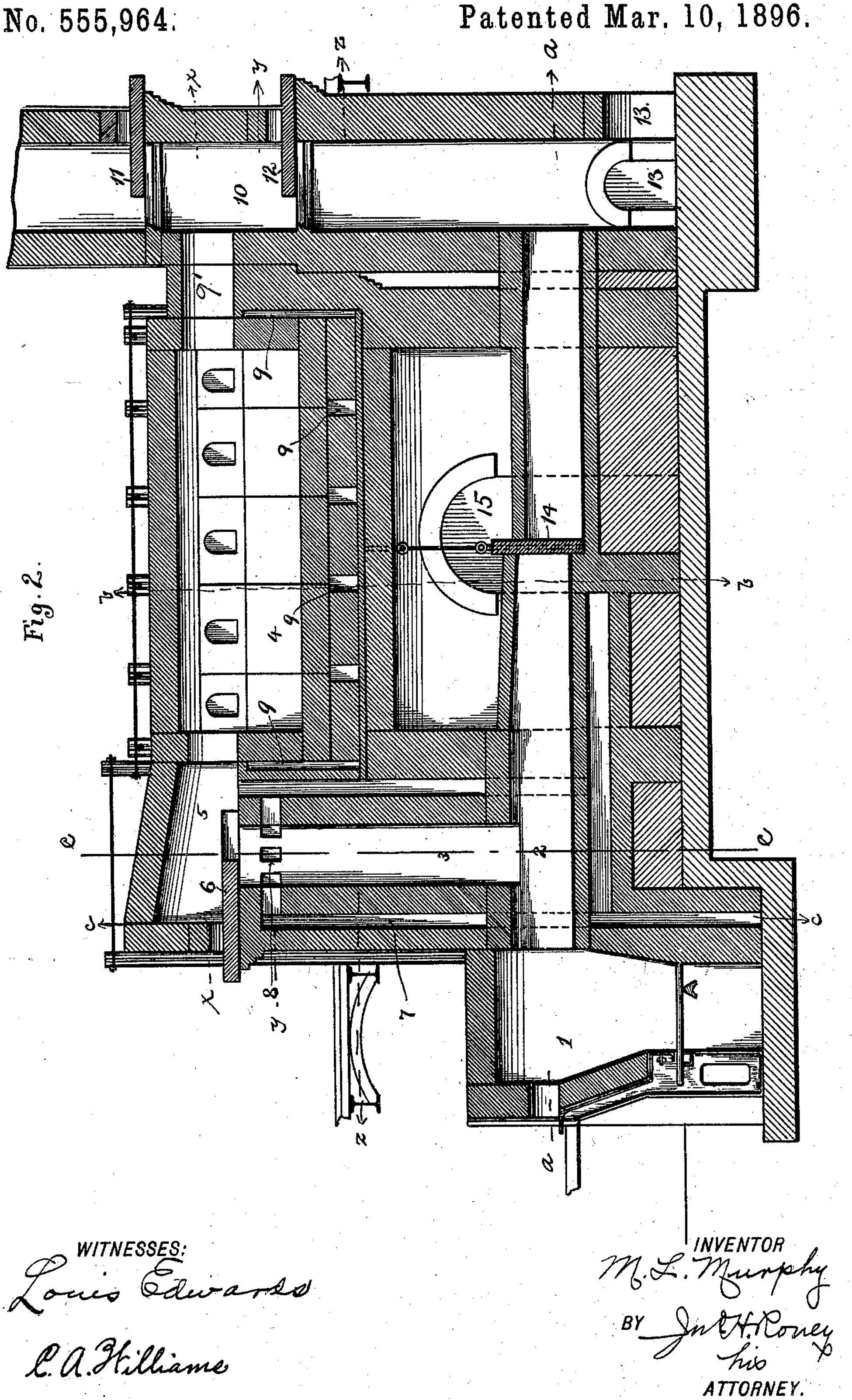
Figures 3, 4, 5:
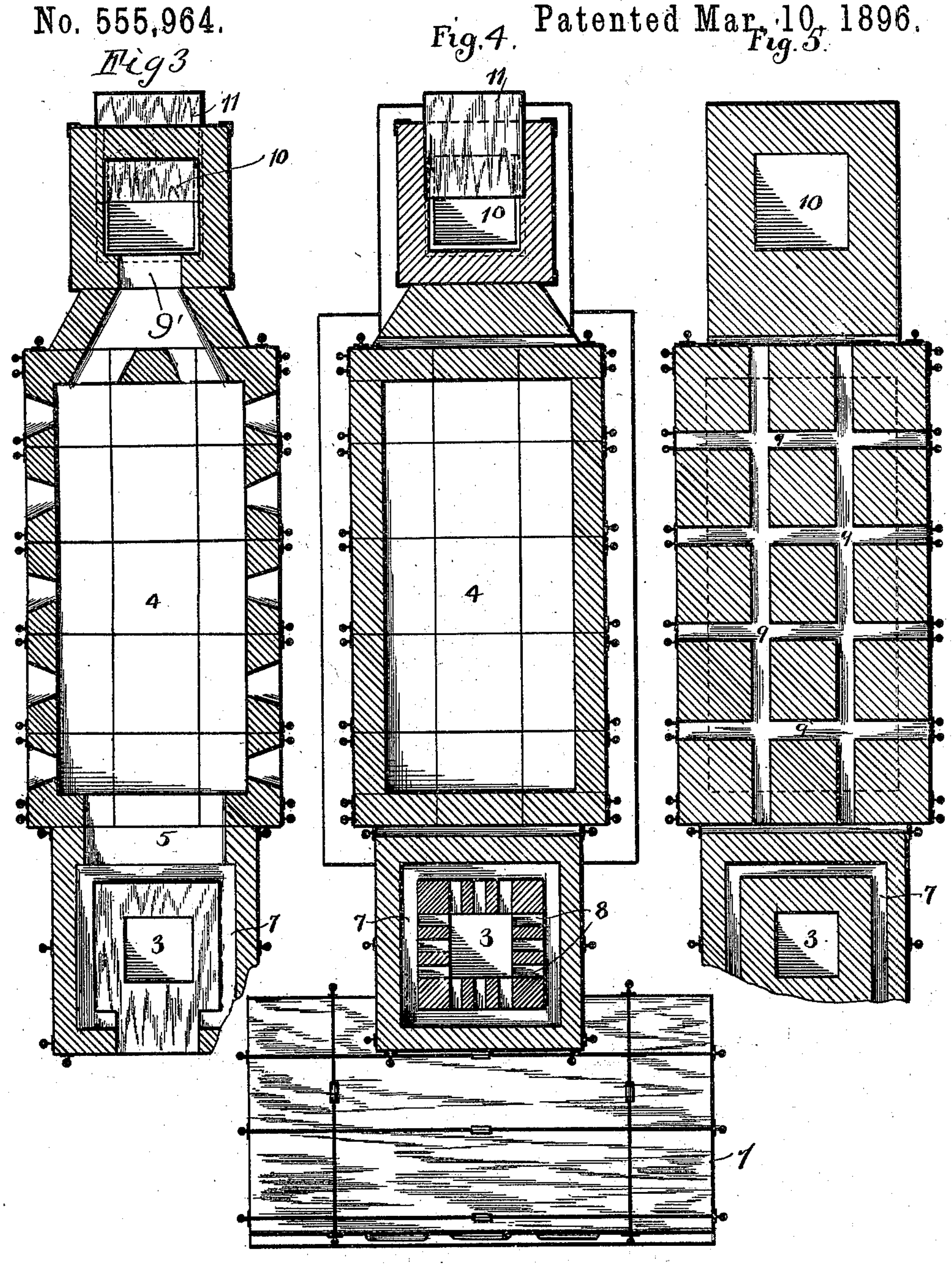
Figure 6:
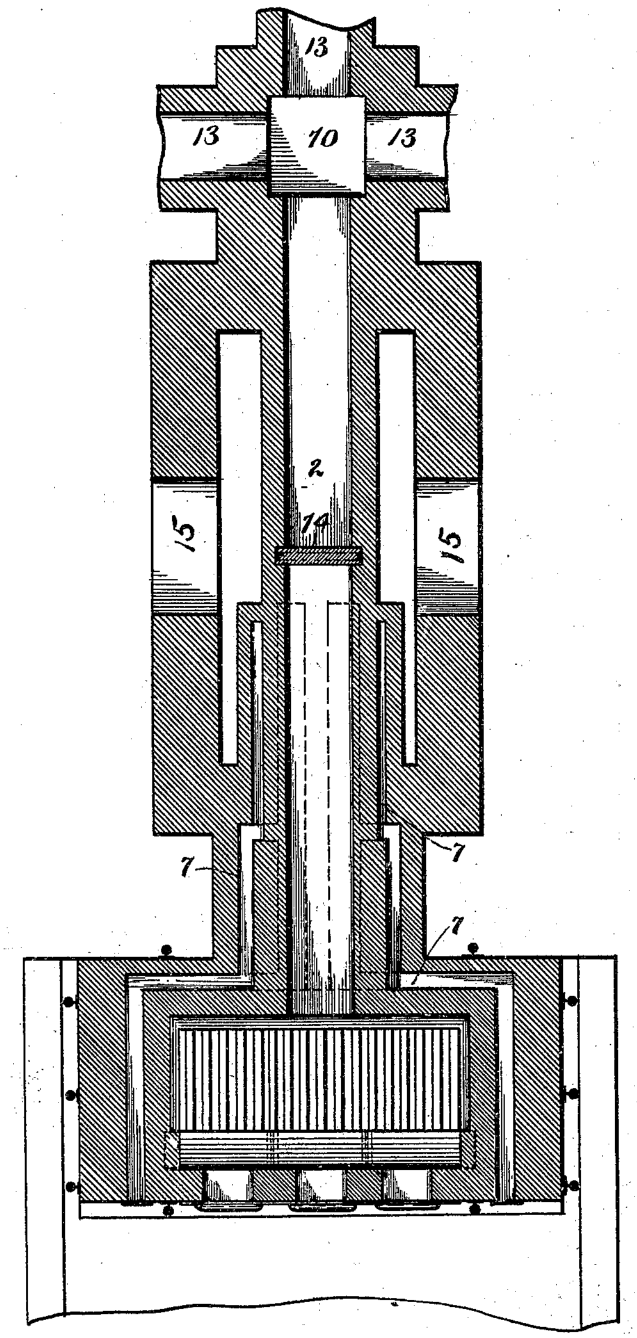
Figure 7:
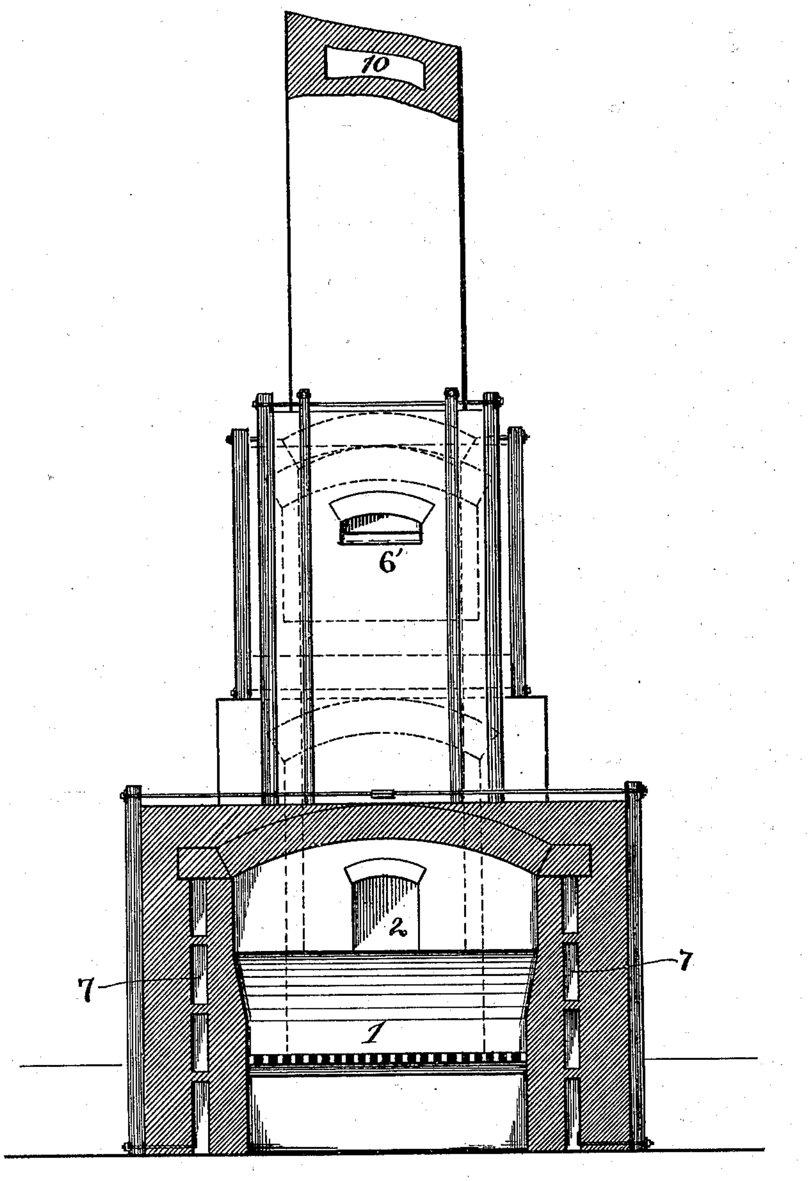
Figure 9:
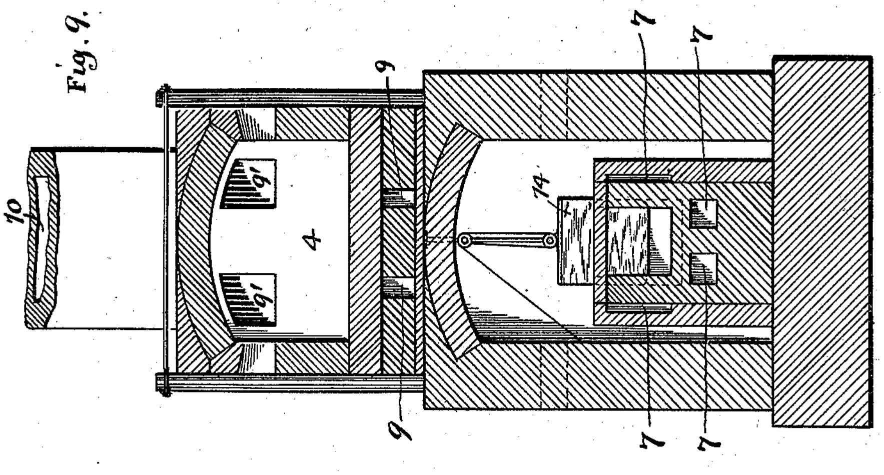
Figure 8:
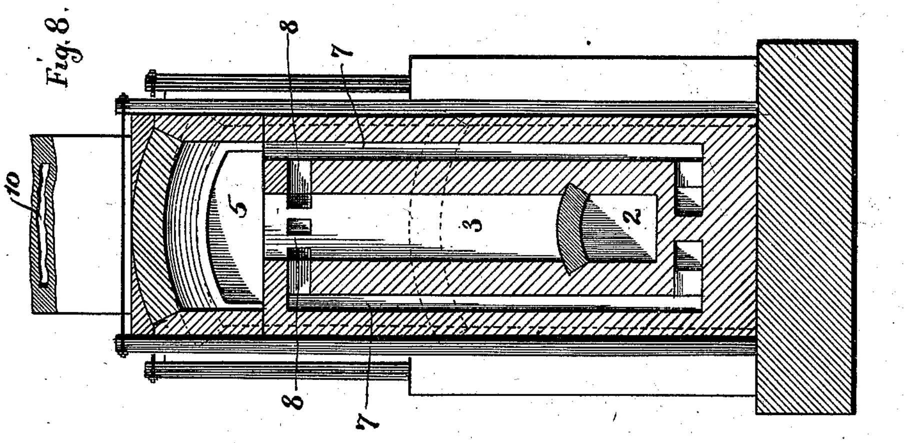

Figure 1 indicates a side elevation of my improved tank-furnace. Fig. 2 is a longitudinal central section of same. Figs. 3, 4, and 5 are horizontal sections on lines *x x*, *y y*, *z z* of Fig. 2. Fig. 6 is a horizontal section on line *a a* of Fig. 2. Fig. 7 is a front elevation in section through the producer of same on line *d d* of Fig. 1. Figs. 8 and 9 are respectively vertical transverse sections of same through lines *c c* and *b b* of Fig. 2.

My invention relates to that class of glass-smelting furnaces in which the smelting operation is performed in a compartment of considerable size, and commonly called "tank-furnaces;" and it consists of the novel construction and arrangement of parts hereinafter specifically described, reference being had to the accompanying drawings, forming part hereof, in which like numerals indicate like parts wherever they occur.

Referring to said drawings, 1 is a gas-producer located at the front of the furnace and communicating therewith through the horizontal channel or flue 2. Said channel is connected with a vertical flue 3, which communicates with the tank 4 by the arch or channel 5. Said flue 3 is adapted to be closed by the damper 6, whereby the hot gases are prevented from entering said tank—as, for instance, when the workmen are blowing. A chamber 7 surrounds said vertical flue 3 and communicates therewith through the short horizontal flues 8 for the purpose of admitting air and discharging the same into the heated gases ascending said vertical flue 3 immediately before the same is admitted into said tank, whereby an intense temperature is obtained. Beneath said tank a series of cold-air ports 9 9 are located at such points immediately beneath and opposite the joints forming the sides and bottom of said tank, also at the sides of the same, whereby the liquid glass exuding therefrom in the event of an opening at such point is cooled and solidified, forming a vitreous joint at such place or point. Said horizontal flue 2 passes from the front to the rear of said furnace, beneath the tank thereof, and connects the producer with the exit-flue 10, which is provided with the dampers 11 and 12, arranged as shown in the drawings for the purpose hereinafter set forth. Said exit-flue at the lower end thereof is connected with a horizontal flue or channel 13, which may communicate with a flattening oven or leer, (not shown,) as hereinafter described. About midway said horizontal flue I locate a damper 14, whereby heated gases are (when the damper 6 is open) directed through the vertical flue 3 into the tank for the purpose of smelting the glass, thence through the ports 9′ 9′, which communicate with the exit-flue 10. The dampers 11 and 12 being closed, the damper 14 being open, and damper 6 closed, the gases are permitted to accumulate in said channels or flues 2, 3 and 13 for the purpose of use after the blowing is completed; or the gas accumulating in said channels may be utilized in leers or ovens connected with said furnace by the flue 13.

15 is a cave of the furnace, which extends entirely across the same beneath the tank.

The operation of my furnace is as follows, viz: The producer being charged with fuel, the dampers 14 and 12 being closed, and the dampers 6 and 11 being open, the hot gases pass from said producer into the vertical flue 3 and combine with the air admitted through the flues or ports 8 from the chamber 7 surrounding said vertical flue, and thence into the tank in which the batch of material for making glass is charged. Immediately said batch is smelted and in condition for blowing the dampers 6, 11 and 12 are closed and damper 14 opened, and the gases are permitted to accumulate in the channels 3 and 2 or may be utilized, as heretofore stated, in leers or ovens. (Not shown, but connected with said furnace by the channel 13.)

Having described my invention, what I claim, and desire to secure by Letters Patent, is—

1. In a glass-tank furnace substantially as described, the combination of one or more producers; a tank or smelting-chamber having cold-air inlets or ducts beneath the same; a horizontal chamber or flue extending from said producers having a damper therein; a vertical flue connecting said tank and horizontal flue, and provided with a damper; an air-chamber surrounding said vertical flue, and communicating therewith by a series of horizontal flues; an exit-flue or chimney having a damper above the plane of the port opening from said tank into said chimney, and a damper below the plane of said port, said chimney communicating with a port leading to a leer and with a flue leading to the gas-producer, substantially as described.

2. In a glass-tank furnace, the combination of one or more gas-producers; a horizontal chamber or flue having a damper or valve, connecting a leer at the rear with said producers; a vertical flue surrounded by an air-chamber, and communicating with said vertical flue by a series of horizontal flues; a tank having cold-air inlets beneath the same; and an exit-flue or chimney provided with a damper at a point above the plane of the opening from said tank into said chimney, and a damper below the plane of the opening from said tank into said chimney, and communicating with a port or flue leading to a leer and with a flue leading to the gas-producer, substantially as described.

In testimony that I claim the foregoing I hereunto affix my signature this 16th day of November, A. D. 1894.

MICHAEL L. MURPHY. [L. S.]

In presence of—

JAS. J. MCAFEE,

C. A. WILLIAMS.